United States Patent [19]

Lew

[11] Patent Number: 5,679,901
[45] Date of Patent: *Oct. 21, 1997

[54] VORTEX SENSING PRESSURE TRANSDUCER

[76] Inventor: Hyok Sang Lew, 7890 Oak St., Arvada, Colo. 80005

[*] Notice: The term of this patent shall not extend beyond the expiration date of Pat. No. 5,509,311.

[21] Appl. No.: 508,930

[22] Filed: Jul. 28, 1995

Related U.S. Application Data

[63] Continuation-in-part of Ser. No. 283,566, Aug. 1, 1994, which is a continuation-in-part of Ser. No. 280,216, Jul. 25, 1994, which is a continuation-in-part of Ser. No. 248,354, May 24, 1994, which is a continuation-in-part of Ser. No. 34,516, Mar. 19, 1993, Pat. No. 5,456,116, and Ser. No. 772,964, Oct. 8, 1991, Pat. No. 5,214,965.

[51] Int. Cl.$^6$ .................................................. G01F 1/32
[52] U.S. Cl. ................................... 73/704; 73/861.24
[58] Field of Search ........................ 73/861.24, 661, 73/704

[56] References Cited

U.S. PATENT DOCUMENTS

| 5,214,965 | 6/1993 | Lew | 73/861.24 |
| 5,477,737 | 12/1995 | Lew | 73/704 |
| 5,509,311 | 4/1996 | Lew | 73/661 |

Primary Examiner—Richard Chilcot
Assistant Examiner—Jewel Artis

[57] ABSTRACT

A vortex flowmeter employs a differential pressure transducer converting oscillation in a differential pressure to an alternating electrical signal, wherein the differential pressure transducer comprises a pair of pressure compartments (10 and 11) respectively receiving two fluctuating fluid pressures respectively existing at two fluid regions located on the two opposite sides (8 and 9) of a vortex generator (3) respectively through a pair of tubings (13 and 14, 43 and 44, or 61 and 62) or through a pair of holes (69 and 70, or 72 and 73) embedded within the wall of the flow passage.

11 Claims, 3 Drawing Sheets

$$\dot{V} = F(f)$$
$$\dot{M} = G(f, A)$$
$$\rho = \dot{M}/\dot{V}$$

5,679,901

VORTEX SENSING PRESSURE TRANSDUCER

This patent application is a Continuation-In-Part to patent application Ser. No. 08/283,566 filed Aug. 01, 1994 that is a Continuation-In-Part to patent application Ser. No. 08/280,216 filed Jul. 25, 1994 that is a Continuation-In-Part to patent application Ser. No. 08/248,354 filed May 24, 1994 that is a Continuation-In-Part to patent application Ser. No. 08/034,516 filed Mar. 19, 1993, now U.S. Pat. No. 5,456,116 and a Continuation-In-Part to patent application Ser. No. 07/772,964 filed Oct. 08, 1991, now U.S. Pat. No. 5,214,965.

FIELD OF INVENTION

This invention relates to a vortex flowmeter employing a differential pressure transducer detecting the difference in the fluid pressure between two fluid regions respectively located on two diametrically opposite sides of a vortex generating bluff body disposed across a flow passage, wherein a pair of pressure compartments included in the differential pressure transducer respectively receive the two fluid pressures respectively existing in the two fluid regions located on the two diametrically opposite sides of the bluff body respectively through a pair of conduits provided by a pair of small diameter tubings or by a pair of holes embedded within the wall of the flow passage.

BACKGROUND OF INVENTION

In an earlier invention of this inventor disclosed in U.S. Pat. No. 5,214,965, a vortex flowmeter employs a differential pressure sensor that detects the difference in the fluid pressure between two fluid regions respectively existing adjacent to two opposite sides of a vortex generating bluff body of an elongated cylindrical shape disposed perpendicularly across a flow stream, wherein the velocity or volume flow rate of fluid is determined as a function of the frequency of an alternating electrical signal generated by the differential pressure sensor and/or the mass flow rate of fluid is determined as a function of the frequency and amplitude of the alternating electrical signal. Experiments with and testing of the vortex flowmeter employing a differential pressure transducer have shown that, in general, the differential pressure transducer or other types of pressure transducers used as a vortex sensor works best, particularly in noisy and vibratory environments, when the differential pressure transducer is disposed in a dynamically buffered and/or dynamically isolated relationship from the mechanical vibrations of the flowmeter body and the pipe line or conduit providing the flow passage, and receives two fluid pressures existing in regions respectively adjacent to two opposite cylindrical sides of the vortex generating bluff body respectively through two small diameter tubings or conduits having a low stiffness or a high flexibility. The above-described approach to the design and construction of the vortex flowmeter also teaches the construction and operation of an economic version thereof wherein the pressure transmitting holes supplying the two fluid pressures or one of the two fluid pressures in an ultra economic version, are disposed through the wall of the flow passage and connected directly to the differential pressure transducer with or without a buffering element included in the mechanical connection between the flowmeter body and the differential pressure sensor. It should be pointed out that the version of the vortex flowmeter employing the differential pressure sensor receiving the two fluid pressures through a pair of small diameter tubings of sizable length has a particularly useful advantage in measuring flow rates of fluid media heated or cooled to extreme temperatures as in the case of cryogenic fluids and very high temperature fluids.

BRIEF SUMMARY OF INVENTION

The primary object of the present invention is to provide a vortex flowmeter comprising a flow passage with a vortex generating bluff extending thereacross at least partially in a perpendicular angle to the direction of fluid flow, and a differential pressure transducer receiving two fluid pressures existing in two regions respectively adjacent to the two opposite cylindrical sides of the vortex generating bluff body respectively through two small diameter tubings having a low stiffness or a high flexibility, or through a pair of conduits or holes disposed through the wall of the flow passage, wherein the differential pressure transducer generates an alternating electrical signal representing the vortex shedding from the vortex generating bluff body.

Another object is to provide the differential pressure transducer connected to the flowmeter body in a dynamically and/or thermally buffering relationship therebetween.

A further object is to provide the differential pressure transducer enclosed within an acoustically insulating enclosure blocking the transmission of the acoustic noise existing in the ambient surroundings.

Yet another object is to provide the differential pressure transducer secured to a supporting structure dynamically isolated from the vibrations of the pipe line or conduit providing the flow passage.

Yet a further object is to provide the differential pressure transducer supported by the pipe line or conduit providing the flow passage in a structural relationship providing a dynamic buffering between the differential pressure transmitter and the pipe line or conduit.

Still another object is to provide an ultra inexpensive vortex flowmeter employing a differential pressure transducer of mass-produced construction that receives the two fluid pressures through a pair of conduits or holes disposed through the wall of the flow passage provided by the flowmeter body.

These and other objects of the present invention will become clear as the description of the invention progresses.

BRIEF DESCRIPTION OF FIGURES

The present invention may be described with a greater clarity and specificity by referring to the following figures.

DESCRIPTION OF ILLUSTRATED EMBODIMENTS

The vortex flowmeter of the present invention may employ one of the types of differential pressure transducers shown and described in the parent patent applications of the present patent application, or other types of differential pressure transducers currently available in the field of pressure sensing or detecting technology, or those to become available in the future. As the magnitude of pressure difference between two fluid regions respectively located on the two diametrically opposite sides of the vortex generating bluff body has a very small value, especially when the velocity of fluid falls below 10 feet per second for gases and 2 feet per second for liquids, the differential pressure transducer included in the vortex flowmeter must have a very high sensitivity.

Figure 1:
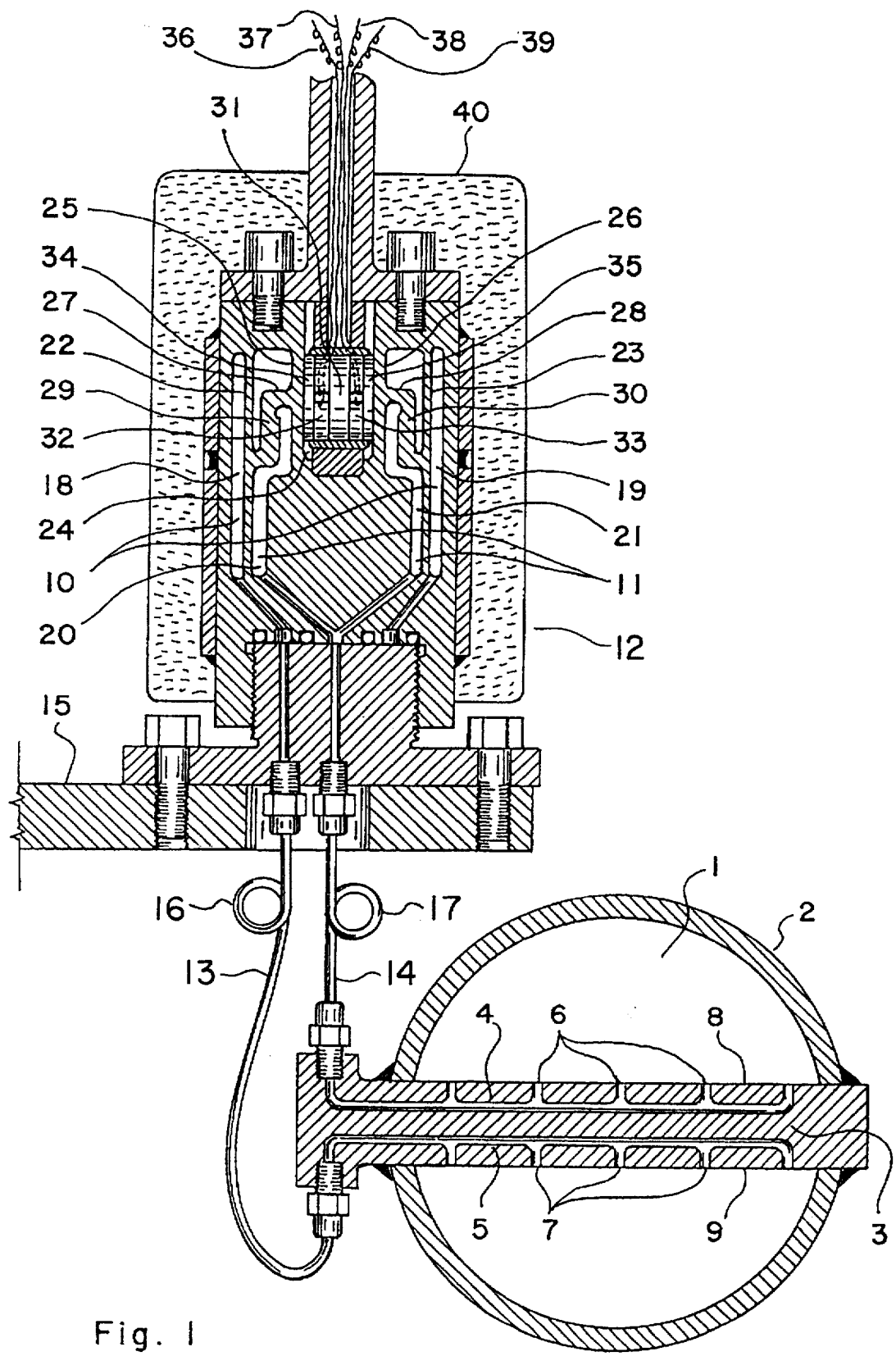
FIG. 1 illustrates an embodiment of the vortex flowmeter of the present invention.

In FIG. 1 there is illustrated a cross section of an embodiment of the vortex flowmeter constructed in accordance with the principles of the present invention. A flow passage i provided by a pipe or conduit 2 includes a vortex generating bluff body 3 of elongated cylindrical shape disposed across the flow passage 1, which vortex generating bluff body 3 has two pressure transmitting holes 4 and 5 respectively including two sets 6 and 7 of pressure receiving openings open to the two opposite cylindrical sides 8 and 9 of the bluff body 3. The two fluid pressures existing in regions respectively adjacent to the two opposite cylindrical sides 8 and 9 of the bluff body 3 and tapped respectively through the two sets 6 and 7 of the pressure receiving openings are introduced respectively into two pressure compartments 10 and 11 included in an oscillatory differential pressure transducer 12 respectively through two small diameter conduits or tubings 13 and 14 having a low stiffness or a high flexibility. It should be noticed that the differential pressure transducer 12 is mounted on a rigid and massive supporting structure 15, and the two pressure transmitting conduits or tubings 13 and 14 having a small diameter and low stiffness respectively include looped sections 16 and 17 which play the role of an expansion joint dynamically as well as thermally, whereby the differential pressure transducer 12 is dynamically isolated from the pipe line or conduit 2 in such a way that the structural vibrations of the pipe line or conduit 2 as well as the thermal stress experienced thereby are not transmitted or propagated to the differential pressure transmitted 12. The first pressure compartment 10 comprises two planar cavities 18 and 19, while the second pressure compartment 11 comprises two planar cavities 20 and 21. A first thin deflective planar member 22 separates the two planar cavities 18 and 20 from one another, and a second thin deflective planar member 23 separates the two planar cavities 19 and 21 from one another. A cavity 24 containing a piezo electric transducer assembly has two opposite thin walls 25 and 26 disposed parallel to one another and straddling a reference plane perpendicularly intersecting therewith and dividing the cavity 24 into two opposite semicylindrical halves of the cavity 24. The two opposite thin walls 25 and 26 respectively include two reinforcing ribs 27 and 28 disposed diametrically thereacross on the reference plane, and two force transmitting members 29 and 30 extend respectively from the two reinforcing ribs 27 and 28 in a common direction generally parallel to the two thin walls 25 amd 26, and are connected respectively to the two thin deflective planar members 22 and 23 at the extremities thereof. The best result is obtained when the extremity of the force transmitting member 29 or 30 is connected to the most deflective portion of the thin deflective planar member 22 or 23 such as the center portion thereof. It should be noticed that each of the two force transmitting members 29 and 30 has a stub cylindrical midsection and two opposite short angled extremities respectively anchored to the center portion of the thin wall 25 or 26 and the center portion of the thin deflective planar member 22 or 23. The differential pressure created by vortex shedding from the two opposite cylindrical sides 8 and 9 of the bluff body 3 in an alternating manner creates a relative lateral vibration between two thin deflective planar members 22 and 23, which in turn creates minute vibratory pivotal motions of the two opposite thin walls 25 and 26 in two opposite directions respectively about two pivot axes, each of which two pivot axes is defined by the line of intersection between the thin wall 25 or 26 and the reinforcing rib 27 or 28 of the thin wall. The piezo electric transducer assembly contained within the cavity 24 comprises a stacked combination of a piezo electric disc element 31 sandwiched between a pair of split electrode discs 32 and 33, which stacked combination sandwiched between a pair of insulator discs 34 and 35 is disposed intermediate the two thin end walls 25 and 26 in a compressed relationship between the thin walls 25 and 26, and straddles the reference plane defined by the two reinforcing ribs 27 and 28. Each of the pair of split electrode discs 32 and 33 is split along the reference plane into two semicircular electrodes respectively located on the two opposite sides of the reference plane. The plurality of lead wires 36, 37, 38 and 39 extend respectively from four different semicircular electrodes provided by the pair of split electrode discs 32 and 33. An alternating electrical signal representing the vortex shedding from the bluff body 3 is obtained by amplifying and combining two electrical signals respectively supplied by two semicircular electrodes respectively located on two opposite sides of the reference plane. The differential pressure transducer 12 may be enclosed within an acoustically insulating enclosure 40 buffering transmission of acoustical vibrations from the ambient surroundings to the interior of the differential pressure transducer 12. In applications subjected to extremely cold or hot temperature, the acoustically insulating enclosure 40 may be replaced by a heating or cooling jacket in order to keep the piezo electric transducer disc element 31 at a desirable temperature.

It must be mentioned and emphasized that the novel features of the present invention exemplified by the embodiment shown in FIG. 1 are, firstly, the dynamic isolation of the differential pressure transducer, which isolation is provided by a supporting structure experiencing zero or little mechanical vibration and structurally isolated from the pipe line or conduit providing the flow passage, secondly, the transmission of the fluctuating fluid pressures associated with the vortex shedding to the differential pressure transducer through two small diameter conduits or tubings having a low stiffness or a high flexibility, which low stiffness or high flexibility of conduits or tubings prevents the structural vibrations of the pipe line or conduit providing the flow passage to the differential pressure transducer, and thirdly, the small diameter conduits or tubings transmitting the fluctuating fluid pressure from the flow passage to the differential pressure transducer thermally isolates the differential pressure transducer from the fluid contained in the flow passage and, consequently, the vortex flowmeter is able to measure flow rates of cryogenic fluids and very high temperature fluids. It should be understood that only one of the two fluid pressures supplied to the differential pressure transducer 12 may be tapped from a region adjacent to one of the two opposite cylindrical sides 8 and 9 of the bluff body 3, while the other of the two fluid pressures is tapped from a region upstream of or remote from the bluff body. It should be further understood that one or both of the two fluctuating fluid pressures associated with the vortex shedding may tapped through one or two conduits extending through the wall of the pipe or conduit 2 and terminated at a region or regions in the fluid other than the two opposite cylindrical sides 8 and 9 of the bluff body 3, or a region or regions adjacent to the two opposite cylindrical sides 8 and 9 of the bluff body 3, whereat the fluid pressures fluctuate as a result of the vortex shedding. In practicing the afore-mentioned three advantages of the vortex flowmeter of the present invention, other versions of the differential pressure transducer not shown in the illustrative embodiments and well known in the art of pressure sensing may be employed in place of the particular differential pressure transducer shown and described, in conjunction with the particular version of the fluid pressure tapping embodiment shown and described, or in conjunction with other versions not shown in the illustrative embodiments and well known in the art of vortex sensing such as the pressure tapping tubing or conduits extending through the wall of the pipe and terminated at a region in the fluid different from the immediate vicinity of the bluff body as shown in FIGS. 2, 3, 4 and 5.

Figure 2:
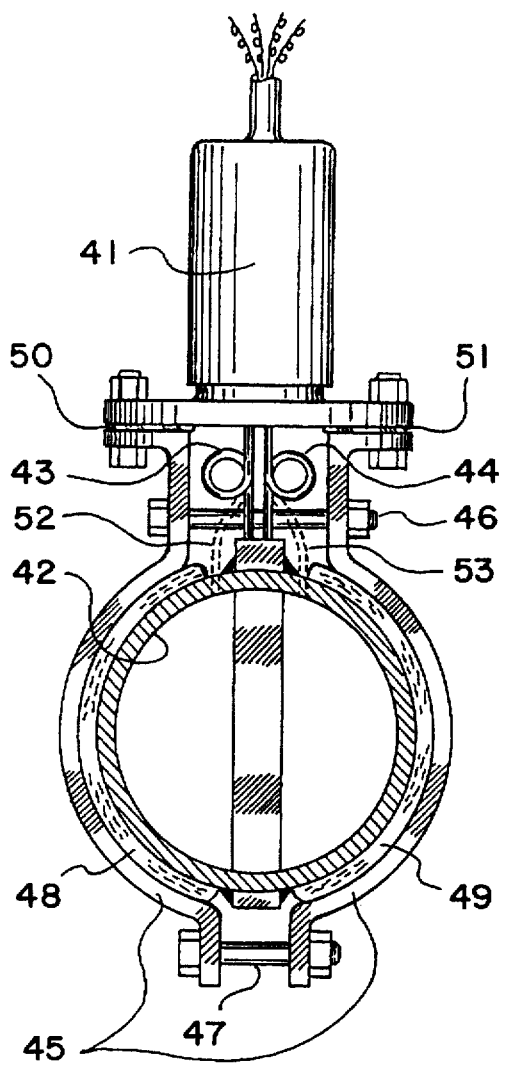
FIG. 2 illustrates another embodiment of the vortex flowmeter of the present invention.

In FIG. 2 there is illustrated another embodiment of the vortex flowmeter employing a differential pressure transducer 41, which may be the type employed in the embodiment shown in FIG. 1 or other types, that is dynamically isolated from the structural vibration of the pipe line 42, and receives the fluid pressures associated with the vortex shedding through two small diameter tubings or conduits 43 and 44 having a low stiffness or or a high flexibility. This particular embodiment shows an alternative to the embodiment shown in FIG. 1 in dynamically isolating the differential pressure transducer 41 from the structural vibrations of the pipe line 42. The yoke or collar structure 45 mounting the differential pressure transducer 41 on the pipe line 42 is mechanically secured to the pipe line 42 by a plurality of clamping bolts and nuts 46, 47, etc., and dynamically insulated from the pipe line 42 by the vibrating absorbing collars 48 and 49 made of a polymer material absorbing and dessipating mechanical vibrations. The mechanical joint between the differential pressure transducer 41 and the yoke or collar structure 45 includes dynamically buffering washers or spacers 50 and 51. The alternative routing of the pressure transmitting tubings 43 and 44 respectively shown in two broken lines 52 and 53, illustrates a modified version of tapping the fluctuating fluid pressures associated with the vortex shedding. While the particular illustrative embodiment shows the differential pressure transducer 41 mounted on on the pipe line 42 in an up-right position, it can be hung on the pipe line in a pendant position as illustrated by an upside-down version of FIG. 2.

Figure 3:
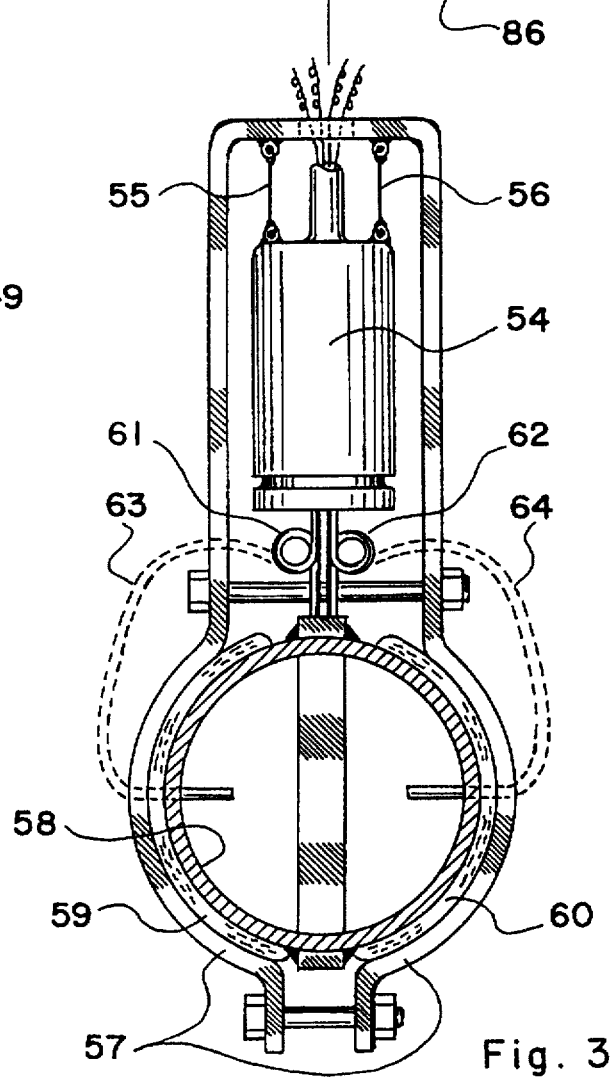
FIG. 3 illustrates a further embodiment of the vortex flowmeter of the present invention.

In FIG. 3 there is illustrated a further embodiment of the vortex flowmeter comprising a dynamically isolated differential pressure transducer. In this particular illustrative embodiment, the differential pressure transducer 54 is suspended by one or a plurality of flexible elongated members 55 and 56 from a yoke or collar structure 57 secured to to the pipe line 58 and dynamically buffered therefrom by the vibration absorbing and dissipating collars 59 and 60. It can be readily realized that, in an alternative design, the differential pressure transducer 54 can be suspended directly from the pipe line 58 or from a saddle structure mounted on the pipe line 58 by one or a plurality of vibration absorbing and dissipating flexible elongated members. The modified routings of the fluid pressure transmitting tubings 61 and 62 shown in two broken outlines 63 and 64 illustrates another alternative for tapping the fluctuating fluid pressures associated with the vortex shedding, wherein the open extremities of the pressure transmitting tubings 63 and 64 extending into the stream of fluid moving through the pipe line 58 may point a direction perpendicular, parallel or angled to the direction of the fluid flow. Of course, the open extremities of the pressure transmitting conduits 63 and 64 can be terminated in a relationship flush to the inner cylindrical surface of the pipe line 58.

Figure 4:
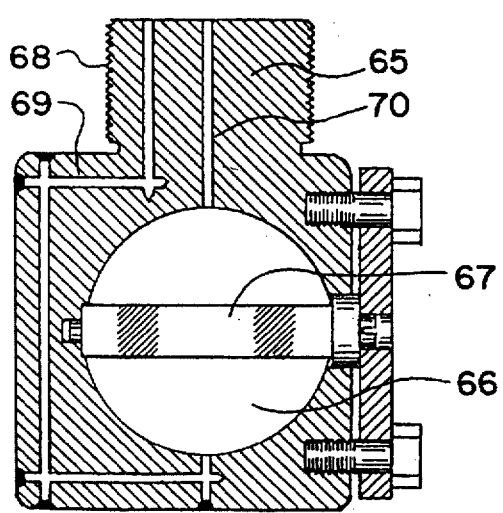
FIG. 4 illustrates an embodiment of the economic version of the flowmeter body to be connected to a differential pressure transducer.

In FIG. 4 there is illustrated a cross section of an embodiment of the economic version of the flowmeter body 65 including the flow passage 66 with a vortex generating bluff body, which flowmeter body 65 is to be connected to the differential pressure transducer shown and described in conjunction with FIG. 1. It can be readily recognized that the differential pressure transducer included in the vortex flowmeter shown in FIG. 1 can be separated from the flowmeter body by unthreading the threaded connection connecting the differential pressure transducer to the flowmeter body shown in the embodiment illustrated in FIG. 1. Consequently, the differential pressure transducer included in the embodiment shown in FIG. 1 can be readily connected to the flowmeter body shown in FIG. 4 by threading the threaded joint including the male thread included in the flowmeter body 65 and the female thread included in the differential pressure transducer shown in FIG. 1. In this particular illustrative embodiment, the fluid pressure transmitting holes 69 and 70 are built into the wall wall structure of the flow passage 66, wherein the two pressure transmitting holes 69 and 70 respectively originate from two diametrically opposite portions of the inner cylindrical surface of the wall of the flow passage 66 respectively located on the two opposite sides of the vortex generating bluff body 67. Of course, the threaded joint between the flowmeter body 65 and the differential pressure transducer can be replaced by a flange joint or other types of face-to-face joints with a gasket or washer made of a vibration absorbing and dissipating material, which gasket or washer provides the dynamic and/or thermal buffering between the flowmeter body and the differential pressure sensor. Since a mass-produced differential pressure transducer of the same size can be connected to all flowmeter bodies of different sizes, the embodiment of the vortex flowmeter shown in FIG. 4 provides tremendously inexpensive vortex flowmeters.

Figure 5:
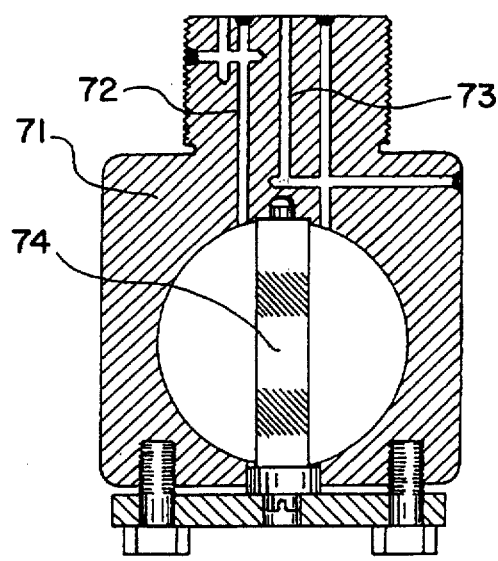
FIG. 5 illustrates another embodiment of the economic version of the flowmeter body to be connected to a differential pressure transducer.

In FIG. 5 there is illustrated a cross section of another another embodiment of the economic version of the vortex flowmeter body 71, that has essentially the same construction as that of the flowmeter body 65 shown in FIG. 4 with an exception that the pressure transmitting holes 72 and 73 now originate respectively from two locations of the flow passage wall respectively adjacent to the two opposite cylindrical sides of the vortex generating bluff body 74. It must be understood that all of the flowmeter bodies shown in FIGS. 1 through 5 may be connected to the differential pressure transducer of type shown in FIG. 1 or other types which are readily available at the present time or become available in the future.

Figure 6:
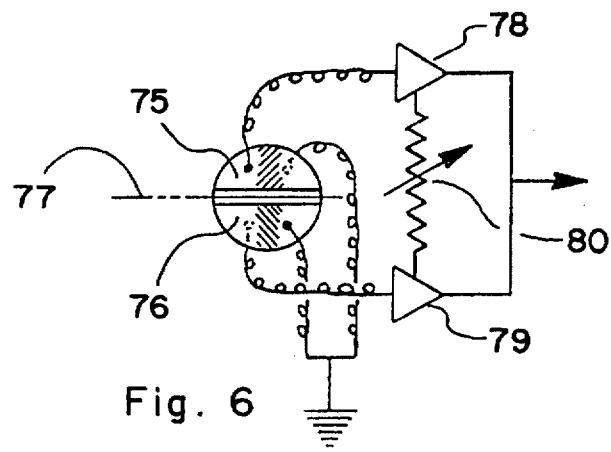
FIG. 6 illustrates an embodiment of the transducer element included in the differential pressure transducer, that converts the alternating fluid pressure to an alternating electrical signal.

In FIG. 6 there is illustrated a plan view of an embodiment of the transducer element seen in a direction perpendicular to the two thin walls 25 and 26 included in the embodiment shown in FIG. 1. Each of the two split electrode discs 32 and 33 sandwiching the piezo electric disc element 31 is split into two semicircular electrodes 75 and 76 respectively located on the two opposite sides of the reference plane. In this particular embodiment, the two semicircular electrodes are in contact with the two opposite faces of the piezo electric disc element and located respectively on the two opposite sides of the reference plane 77 are respectively connected to two amplifiers 78 and 79 with a signal balancing means 80 therebetween. Other electrodes not connected to the two amplifiers 78 and 79 are grounded. The two opposite halves of the piezo electric disc element 31 respectively located on the two opposite sides of the reference plane 77 experience compression and decompression in an alternating manner as a result of the alternating relative lateral deflection between the two thin deflective planar members 22 and 23 included in the differential pressure transducer shown in FIG. 1. When the entire piezo electric disc element 31 is polarized in the same direction, the two semicircular electrodes respectively in contact with the two opposite faces of the piezo electric element and respectively located on the two opposite sides of the reference plane supply two alternating electrical signals in the same phase and, consequently, the two alternating electrical signals are additively combined to obtain an resultant alternating electrical signal representing the vortex shedding in such a way that the noise signal generated by the mechanical vibration is cancelled between the two alternating electrical signals by using the two amplifiers 78 and 79, and the signal level balancing means 80. In an alternative design wherein the two opposite halves of the piezo electric disc element respectively located on the reference plane are polarized in two opposite directions, the two alternating electrical signals have a phase difference of 180 degree and, consequently, the two alternating electrical signals are differentially combined in obtaining the resultant alternating electrical signal by using a combination of the pair of amplifiers and signal level balancing means such as that shown in FIG. 8.

Figure 7:
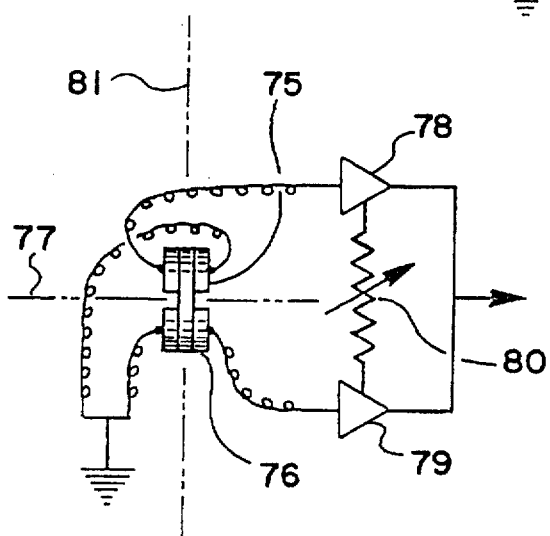
FIG. 7 illustrates another view of the embodiment of the transducer element shown in FIG. 6.

In FIG. 7 there is illustrated an elevation view of the embodiment of the transducer element shown in FIG. 6, which elevation view is seen in a direction parallel to a center plane 81 defined by the piezo electric disc element and intersecting the reference plane 77 perpendicularly. It is clearly shown that the two electrodes respectively connected to the two amplifiers 78 and 79 are respectively in contact with the two opposite sides of the piezo electric disc element and respectively located on the two opposite sides of the reference plane.

Figure 8:
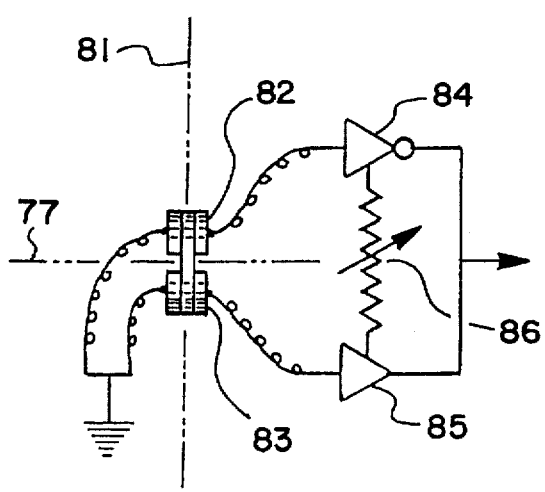
FIG. 8 illustrates another embodiment of the transducer element included in the differential pressure transducer.

In FIG. 8 there is illustrated another embodiment of the transducer element that is a design alternative of the embodiment shown in FIGS. 6 and 7. In this particular embodiment, two semicircular electrodes 82 and 83 in contact with the same face of the piezo electric transducer disc element and respectively located on the two opposite sides of the reference plane 77 are respectively connected to a noninverting and an inverting amplifiers 84 and 85 with a signal level balancing means 86, which combination additively combines the two alternating electrical signals respectively supplied by the two semicircular electrodes into the resultant alternating electrical signal representing the vortex shedding.

The alternating electrical signal generated by the differential pressure transducer and representing the vortex shedding is supplied to a data processor such as the element 86 included in the embodiment of the vortex flowmeter shown in FIG. 3, which data processor determines the fluid velocity or the volume flow rate $\dot{V}$ of the fluid moving through the flow passage as a function of the frequency of the resultant alternating electrical signal, as the fluid velocity is proportional to the frequency of the resultant alternating electrical signal in a wide range of the fluid velocity. The amplitude of oscillation in the differential pressure associated with the vortex shedding from the vortex generating bluff body is proportional to the dynamic pressure of the fluid flow, which dynamic pressure is equal to one half of the fluid density times the square of the fluid velocity. Consequently, the amplitude of the resultant alternating electrical signal generated by the differential pressure transducer is also proportional to the dynamic pressure of the fluid flow. The data processor 86 may also determine the mass flow rate $\dot{M}$ of the fluid as a ratio of the amplitude to the frequency of the resultant alternating electrical signal generated by the differential pressure transducer. Of course, the density $\rho$ of the fluid can be determined as the ratio of the mass flow rate to the volume flow rate of the fluid. A brief investigation of the construction and operating principles of the differential pressure transducer included in the vortex flowmeter shown in FIG. 1 reveals a fact that the differential pressure transducer still works even when one of the two pressure compartments is sealed off and the combination of one of the two sets of pressure receiving openings and one of the two pressure transmitting conduits or holes supplying the fluid pressure to the now sealed off pressure compartment is omitted. Such a simplified version of the embodiment shown in FIG. 1 may be used as an economic version of the vortex flowmeter in applications requiring the sensitivity of the apparatus at a reduced level. It should be pointed out that the implementation of the principles of the present invention exemplified by the illustrative embodiments in the practice of the vortex flowmeter technology makes it possible to measure the velocity or the volume flow rate of fluid accurately and reliably by using a vortex flowmeter under all working environments and operating conditions including applications subjected to very violent pipe line vibrations and extremely high ambient acoustic noise as well as to the temperatures of cryogenic state or extremely high temperatures.

While the principles of the present inventions have now been made clear by the illustrative embodiments shown and described, there will be many modifications of the structures, arrangements, proportions, elements and materials, which are immediately obvious to those skilled in the art and particularly adapted to the specific working environments and operating conditions in the practice of the inventions without departing from those principles. It is not desired to limit the inventions to the particular illustrative embodiments shown and described and, accordingly, all suitable modifications and equivalents may be regarded as falling within the scope of the inventions as defined by the claims which follow.

The embodiments of the inventions, in which an exclusive property or privilege, is claimed are defined as follows:

1. An apparatus for measuring flow rate of fluid comprising in combination:
   a) a flow passage;
   b) a vortex generator generating vortices in a stream of fluid moving through the flow passage;
   c) means for converting an oscillation in fluid pressure associated with the vortices to an alternating electrical signal representing generation of vortices by the vortex generator; and
   d) at least one pressure communicating hole with one end exposed to a fluctuating fluid pressure associated with the vortices and the other end opposite to said one end connected to at least one pressure compartment included in said means for converting an oscillation in fluid pressure to an alternating electrical signal;

wherein at least a portion of said at least one pressure communicating hole includes one of the following two conduits; a tubing transmitting a fluctuating fluid pressure associated with the vortices from the fluid to said at least one pressure compartment, and a hole embedded within a structure including the flow passage and transmitting a fluctuating fluid pressure associated with the vortices from the fluid to said at least one pressure compartment.

2. An apparatus as defined in claim 1 wherein said means for converting an oscillation in fluid pressure to an alternating electrical signal comprises a differential pressure transducer with a pair of pressure compartments, and a first pressure communicating hole with one end exposed to a first fluid region located on one side of the vortex generator transmits a first fluctuating fluid pressure to one of the pair of pressure compartments and a second pressure communicating hole with one end exposed to a second fluid region located on the other side of the vortex generator opposite to said one side transmits a second fluctuating fluid pressure to the other of the pair of pressure compartments; wherein at least a portion of each of the first and second pressure communicating holes includes one of the following two conduits; a tubing transmitting a fluctuating fluid pressure associated with the vortices from the fluid to one of the pair of pressure compartments, and a hole embedded within the structure including the flow passage and transmitting a fluctuating fluid pressure associated with the vortices to one of the pair of pressure compartments.

3. An apparatus as defined in claim 2 including means for determining velocity of fluid moving through the flow passage as a function of a frequency of the alternating electrical signal representing oscillation in differential pressure between the first and second fluctuating fluid pressures.

4. An apparatus as defined in claim 2 including means for determining mass flow rate of fluid moving through the flow passage as a function of a frequency and an amplitude of the alternating electrical signal representing oscillation in differential pressure between the first and second fluctuating fluid pressures.

5. An apparatus as defined in claim 2 wherein the differential pressure transducer is dynamically isolated from the structure including the flow passage in a relationship wherein transmission of mechanical vibrations from the structure including the flow passage to the differential pressure transducer is substantially suppressed.

6. An apparatus as defined in claim 2 wherein at least a portion of each of the first and second pressure communicating holes includes a conduit of a small diameter and a substantial length, whereby the differential pressure transducer is thermally isolated from the structure including the flow passage.

7. An apparatus as defined in claim 2 wherein the differential transducer includes a pair of thin deflective planar members respectively constituting two opposite walls of one of the pair of pressure compartments and separating the pair of pressure compartments from one another, and a transducer means converting an oscillatory relative deflection between the pair of thin deflective planar members to the alternating electrical signals as a measure of flow rate of fluid moving through the flow passage.

8. An apparatus as defined in claim 7 including means for determining velocity of fluid moving through the flow passage as a function of a frequency of the alternating electrical signal representing oscillation in differential pressure between the first and second fluctuating fluid pressures.

9. An apparatus as defined in claim 7 including means for determining mass flow rate of fluid moving through the flow passage as a function of a frequency and an amplitude of the alternating electrical signal representing oscillation in differential pressure between the first and second fluctuating fluid pressures.

10. An apparatus as defined in claim 7 wherein the differential pressure transducer is dynamically isolated from the structure including the flow passage in a relationship wherein transmission of mechanical vibrations from the structure including the flow passage to the differential pressure transducer is substantially suppressed.

11. An apparatus as defined in claim 7 wherein at least a portion of each of the first and second pressure communicating holes includes a conduit of a small diameter and a substantial length, whereby the differential pressure transducer is thermally isolated from the structure including the flow passage.

* * * * *